Dec. 2, 1952          G. R. McINTOSH          2,619,748
RECIPROCATING BLADE FOR CARRY-TYPE SCRAPER
Filed Jan. 16, 1948          2 SHEETS—SHEET 1
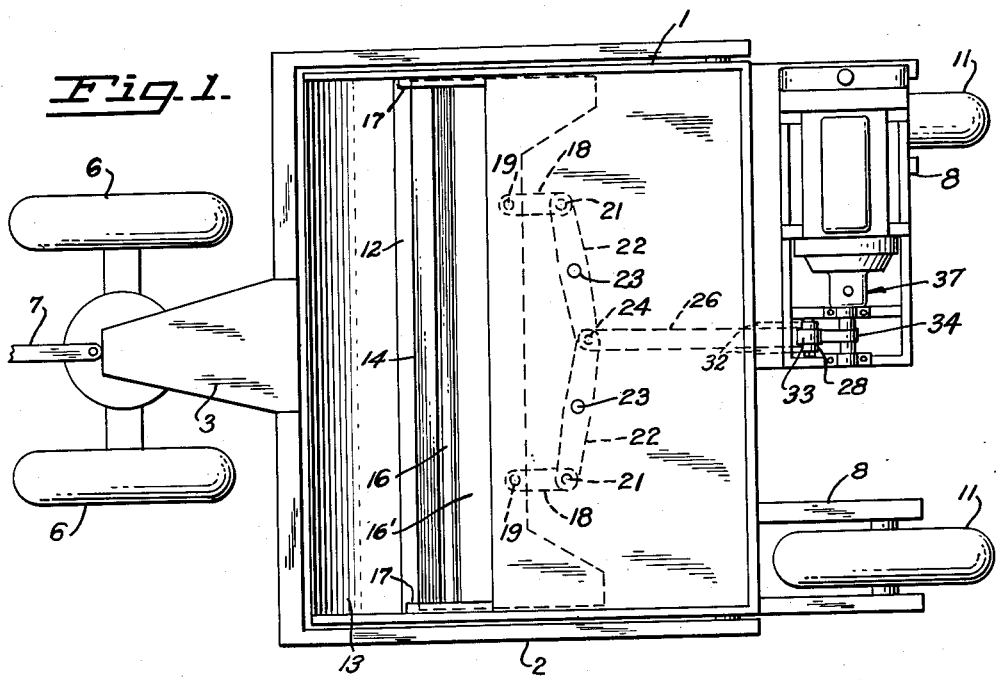
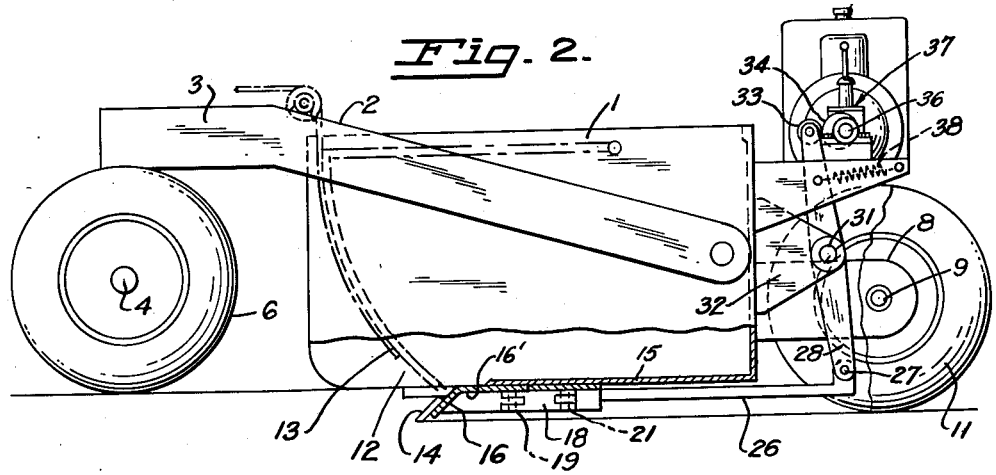
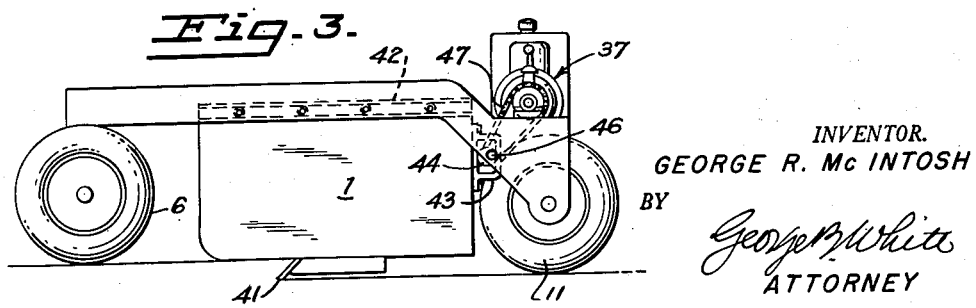
INVENTOR.
GEORGE R. McINTOSH
BY
*George B. White*
ATTORNEY Dec. 2, 1952 G. R. McINTOSH 2,619,748
RECIPROCATING BLADE FOR CARRY-TYPE SCRAPER
Filed Jan. 16, 1948 2 SHEETS—SHEET 2
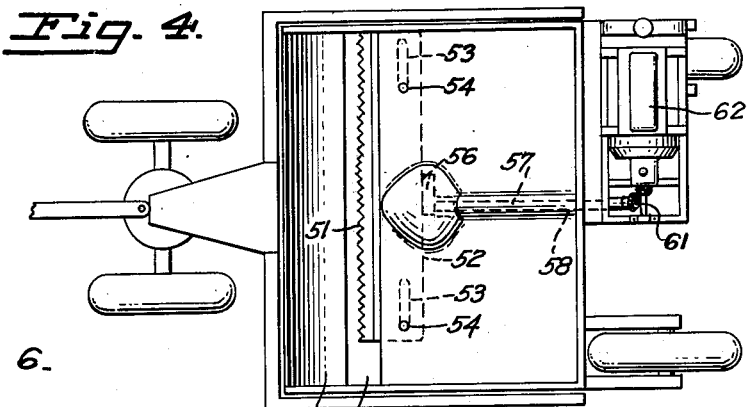
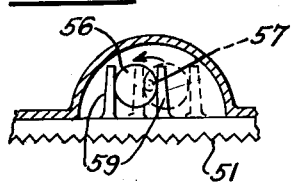
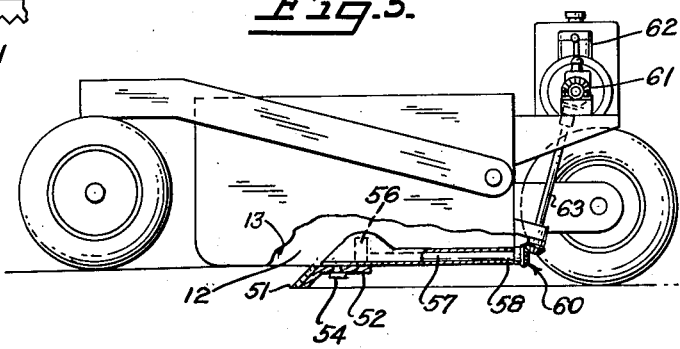
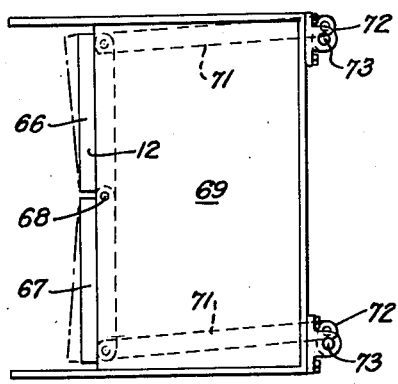
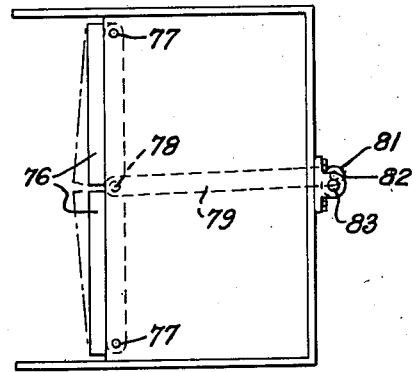
INVENTOR.
GEORGE R. McINTOSH
BY
George B White
ATTORNEY Patented Dec. 2, 1952

2,619,748

UNITED STATES PATENT OFFICE 2,619,748

RECIPROCATING BLADE FOR CARRY-TYPE SCRAPER

George R. McIntosh, Oakland, Calif.

Application January 16, 1948, Serial No. 2,631

2 Claims. (Cl. 37—141)

This invention relates to loading devices for scrapers.

An object of the invention is to provide a device for loading scrapers in hard ground in such a manner as to reduce the need for tractor power. Customarily scrapers in hard ground are pulled, drawn or pushed. It is an object of this invention to provide a means to facilitate the loading of the scrapers to such an extent as to totally obviate the need for the pusher tractor.

Another object of this invention is to provide a scraper blade associated with the bottom of a scraper in such a manner that it has a movement independently of the remaining portions of the scraper for breaking up the hard ground or soil and thereby facilitate the loading of the scraper.

Particularly it is a feature of my invention to produce a motion or vibration of the scraper blade at the bottom of the scraper in such a manner that it breaks up the hard ground in front of the bowl of the scraper and thereby facilitates the scraping and loading; this motion of the blade may be independent of the bottom of the scraper or it may be movable with the bottom of the scraper or in some instances the entire bowl may be vibrated, various types of devices may be provided to move the bottom or the blade and the bottom in various desired manners. For instance the blade may be reciprocated back and forth or with the direction of movement or main axis of the scraper; on the other hand the scraper may be reciprocated transversely with respect of the scraper bottom; or it may be reciprocated with a quasi-circular or other complex movement, according to the moving mechanisms that are applied to such scraper blades and devices of this type.

I am aware that some changes may be made in the general arrangements and combinations of the several devices and parts, as well as in the details of the construction thereof without departing from the scope of the present invention as set forth in the appended specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a top plan view of an embodiment of my invention.

Fig. 2 is a partly sectional side view of said embodiment of my invention.

Fig. 3 is a side view of a modified embodiment of the invention.

Fig. 4 is a plan view of another modified embodiment of the invention.

Fig. 5 is a side view, partly in section of the embodiment shown in Fig. 4.

Fig. 6 is a fragmental detail view of said last modified form.

Figs. 7 and 8 are other modified embodiments of the invention.

There are at the present various types of scrapers in use, one of the main qualities of all of which is that it must be self-loading and preferably self-hauling and self-spreading. In other words a highly maneuverable scraper bowl must be used which as it scrapes the ground it fills the bowl and when neecessary it can lift the scraper off the round and haul the loaded earth away to a suitable place for spreading or dumping. In hard ground or similar type of difficult working conditions it may be necessary to have a pusher tractor to provide the necessary power for scraping the earth and for loading it into the bowl.

In carrying out my invention I make use of a scraper bowl 1 which is pivotally supported on a framework 2 mounted at its forward end 3 upon the usual axle 4 of the front wheels 6. The axle is furnished with a suitable tow bar 7 for the towing by a tractor, not shown. The rear end of the bowl is mounted on suitable brackets 8 mounted upon rear axle 9 carrying wheels 11. At the leading end of the bowl 1 is a bottom opening 12 with a protective apron 13 extended over the opening 12. Along the rear of the bottom opening 12 is provided a scraper blade 14 which extends transversely across the width of the scraper bowl bottom 15. This scraper blade 14 extends on an incline downwardly and forwardly and is fixed upon a cross bar 16 on the forward edge of a plate 16' which in turn is supported on guides 17 along the opposite side edges of the bowl 1. On the plate 16' is pivoted a pair of spaced links 18 on pivots 19 which links extend rearwardly under the bottom 15. The rear ends of the links 18 are pivoted at 21 in the ends of levers 22 which converge toward the central plane of the bowl and each of which is in turn pivoted on a stationary vertical pivot 23 mounted on the bottom 15 of the bowl 1. The center or inner ends of the levers 22 are connected by a pivot 24 to an actuating bar 26 which latter at its rear end is pivoted at 27 to a generally vertical lever 28. This vertical lever 28 is in turn pivoted at about its middle on a horizontal pivot 31 to a bracket 32 extending rearwardly from the bowl 1.

The upper end of the vertical lever 28 has a follower roller 33 therein which rides on the periphery of an eccentric cam 34 keyed on a shaft 36 and rotated by suitable transmission mechanism 37. A coil spring 38 is connected to the upper portion of the lever 28 and to the frame of the transmission 37 and normally pulls the upper end of the lever 28 and its roller 33 toward the cam 34. As the eccentric cam 34 is rotated the upper end of the lever 28 is rocked back and forth and rocks the bottom bar 26 back and forth, rocking the levers 22 so that the outer ends of the latter move back and forth and pull the links 18 and the cross bar 16 therewith. The blade 14 moves with the cross bar 16 back and forth. While the bowl 1 is advanced by a tractor in the usual manner, this reciprocating movement causes the blade 14 to impact against the hard ground with a hammer action breaking the ground up under the bottom opening 12 and thereby allowing the broken ground to ride up on the apron bar 16 and load into the bowl 1, to be carried away in the usual manner.

In the modified form shown in Fig. 3 the entire bowl is reciprocated. The blade 41 in this instance is a solid structure fixed on the bottom of the bowl 1 and is reciprocated with the bowl 1. The upper end of the bowl in this instance is slidably mounted on a guide frame 42 which forms part of the frame structure, which latter frame structure in turn is supported on front and rear axles substantially in the manner heretofore described. On the rear end of the bowl 1 is a hollow guide bracket 43 in which is rotating an eccentric cam 44, the shaft 46 of which is rotated by chain sprocket transmission 47 from the aforementioned transmission means 37 heretofore described. As the eccentric cam 44 is rotated it moves the bowl 1 back and forth on its guides and thus the entire bowl reciprocates back and forth while being drawn forwardly to utilize the breaking action of the forwardly and downwardly inclined blade 41.

In the modified form shown in Figs. 4, 5 and 6 the general structure of the frame and its support as well as the scraper bowl is the same as heretofore described. The difference is in the provision of a transversely reciprocating saw blade 51 which extends near the rear edge of the bowl opening 12 and is supported on a wide cross bar 52, which latter in turn has elongated slots 53 near its opposite ends slidably held upon supporting bolts 54. The saw blade 51 and the cross bar 52 are shorter than the total width of the bowl bottom so as to provide space at each end thereof for reciprocation. The saw blade 51 is inclined forwardly and downwardly, as shown in Fig. 5, so as to saw under and into the dirt or hard ground and allow such ground to work up and over said blade and to load into the interior of the bowl. The herein illustrative embodiment of the reciprocation of the cross bar and saw blade includes an eccentric cam 56 on a horizontal shaft 57, which latter is journalled in suitable journal brackets 58 extended downwardly from the bottom of the bowl 1. The eccentric cam 56 is in a substantially vertical plane and is disposed between opposed abutment flanges 59 on the cross bar 52 so that as the eccentric cam 56 is rotated it is in engagement with the abutment bar 59 and throws the cross bar back and forth transversely with respect to said bowl. The cam shaft 57 is driven by suitable gear transmission 60 which is connected by a drive shaft 63 to a gear transmission 61 of drive mechanism 62 located on the frame of the structure. As the gear transmissions are rotated they rotate the cam 56 which reciprocates the saw blade back and forth as heretofore described.

In the embodiment shown in Fig. 7, the oscillation is accomplished eccentrically from the opposite ends of the blade. In this form the scraper blade is made in two sections 66, 67 which are pivotally connected at their inner ends by a pivot pin 68 supported on the bottom 69 of the bowl. These blades are again near to the rear edge of the opening 12 in the bottom of the bowl. From the free end of each blade section extends rearwardly a link 71 pivoted at one end to the outer end of the adjacent scraper blade section 66 or 67 and at its other end to a rotating eccentric 72, the shaft 73 of which latter is driven in a suitable manner not shown from a drive mechanism. In this manner as the eccentric is rotated, the link 71 moves back and forth and thereby rocks the blade sections 66, 67 forward and backward to the dotted line position and the full line position respectively, as shown in Fig. 7.

Another form of applying the impact and scraping action of the blades upon hard ground is shown in Fig. 8. In this form the outer ends of blade sections 76 are pivoted on fixed pivots 77. The center portions of the blade sections 76 are freely pivoted together by a vertical pivot 78 through which is journalled an end of a link 79, which link in turn is journalled at its rear end 81 to an eccentric 82 the shaft of which eccentric is driven in any suitable manner. Thus as the eccentric 82 is rotated, it rocks the link 79 back and forth and thereby pushes the center portion of the blade 76 forward and backward respectively as into the dotted lines and into the full line positions shown in Fig. 8.

I claim:

1. In combination with a scraper bowl supported by a portable frame for scraping and loading ground, and having a loading opening, a scraper blade extended along the loading opening on the bottom of said bowl, a blade holder movably supported on the bottom of said bowl, and means to impart rocking movement to said blade holder and said blade for loosening and loading the ground through said loading opening, said holder comprising a reciprocating supporting element, guides on said bottom to support the reciprocating element, and a transmission device connecting said reciprocating element to a reciprocating device, said blade having a saw-like edge, said transmission device including a rotating element extended along said bottom, an eccentric cam on said rotating element, and abutments on said blade holder adjacent said cam for converting the rotating motion of said cam into reciprocating movement of said blade holder.

2. In combination with a scraper bowl supported by a portable frame for scraping and loading ground, and having a loading opening, a scraper blade extended along the loading opening on the bottom of said bowl, a blade holder movably supported on the bottom of said bowl, and means to impart rocking movement to said blade holder and said blade for loosening and loading the ground through said loading opening, said holder comprising a reciprocating supporting element, guides on said bottom to support the reciprocating element, and a transmission device connecting said reciprocating element to a reciprocating device, said blade having a saw-like edge, said transmission device including a rotating element extended along said bottom, an eccentric cam on said rotating element, and abutments on said blade holder adjacent said cam for converting the rotating motion of said cam into reciprocating movement of said blade holder, said blade being inclined downwardly and forwardly with respect to said bowl.

GEORGE R. McINTOSH.

REFERENCES CITED

The following references are of record in the file of this patent:

UNITED STATES PATENTS

| Number | Name | Date |
|---|---|---|
| 261,339 | Grove | July 18, 1882 |
| 1,878,037 | Vodoz | Sept. 20, 1932 |
| 1,903,672 | Hauge | Apr. 11, 1933 |
| 1,990,362 | Baker | Feb. 5, 1935 |
| 2,086,573 | Osgood | July 13, 1937 |
| 2,131,373 | Foster | Sept. 27, 1938 |
| 2,443,492 | Austin | June 15, 1948 |